United States Patent
Li et al.

(10) Patent No.: US 12,026,524 B2
(45) Date of Patent: Jul. 2, 2024

(54) METHOD AND APPARATUS FOR PROCESSING LISTENING RESUMING OF MUSIC APPLICATION, AND DEVICE

(71) Applicant: BEIJING BYTEDANCE NETWORK TECHNOLOGY CO., LTD., Beijing (CN)

(72) Inventors: Yang Li, Beijing (CN); Yiming Xiong, Beijing (CN); Yuxin Yang, Beijing (CN); Jiarui Xu, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 15 days.

(21) Appl. No.: 17/438,818

(22) PCT Filed: Jun. 29, 2021

(86) PCT No.: PCT/CN2021/103159
§ 371 (c)(1),
(2) Date: Sep. 13, 2021

(87) PCT Pub. No.: WO2022/198824
PCT Pub. Date: Sep. 29, 2022

(65) Prior Publication Data
US 2023/0214237 A1    Jul. 6, 2023

(30) Foreign Application Priority Data
Mar. 26, 2021    (CN) .................. 202110328585.X

(51) Int. Cl.
*G06F 9/451* (2018.01)
*G06F 3/0482* (2013.01)
(Continued)

(52) U.S. Cl.
CPC ............ *G06F 9/451* (2018.02); *G06F 3/0482* (2013.01); *G06F 3/04847* (2013.01); *G06F 3/0488* (2013.01); *G06F 3/165* (2013.01)

(58) Field of Classification Search
CPC .... G06F 9/451; G06F 3/0482; G06F 3/04847; G06F 3/0488; G06F 3/165
See application file for complete search history.

(56) References Cited

U.S. PATENT DOCUMENTS 9,665,169 B1 * 5/2017 Dai ................... A61B 5/6898
9,742,871 B1 * 8/2017 Gibson ................. H04L 67/63
(Continued)

FOREIGN PATENT DOCUMENTS

| AU | 201312858 A | * | 3/2013 |
| AU | 2014324893 A | * | 2/2015 |

(Continued)

OTHER PUBLICATIONS

Sameer Balaganur, "How Spotify's Algorithm Manages To Find Your Inner Groove", published Jan. 6, 2020 at https://analyticsindiamag.com/how-spotifys-algorithm-manages-to-find-your-inner-groove, retrieved Jun. 6, 2023. (Year: 2020) (Year: 2020).*

(Continued)

Primary Examiner — Shourjo Dasgupta

(57) ABSTRACT

Embodiments of the present disclosure provide a method and an apparatus for processing listening resuming of music application, a device, a computer readable storage medium, a computer program product and a computer program. The method includes: acquiring a playing characteristic parameter of a program subject to playing interruption if occurrence of an event where the program is subjected to playing interruption is monitored, and determining, according to the playing characteristic parameter, whether the program subject to playing interruption satisfies a preset counting rule for listening resuming; if yes, recording the program subject to
(Continued)

playing interruption in a listening resuming module for a user to perform a listening resuming operation.

9 Claims, 5 Drawing Sheets

(51) Int. Cl.
*G06F 3/04847* (2022.01)
*G06F 3/0488* (2022.01)
*G06F 3/16* (2006.01)

(56) References Cited

U.S. PATENT DOCUMENTS

| | | | |
|---|---|---|---|
| 11,435,876 B1* | 9/2022 | Kakati | G06F 9/451 |
| 11,446,548 B2* | 9/2022 | Devine | G06F 3/04883 |
| 2011/0072449 A1 | 3/2011 | Ivanyi | |
| 2014/0123005 A1* | 5/2014 | Forstall | G06F 16/44 |
| | | | 715/716 |
| 2015/0095354 A1* | 4/2015 | Miller | G06F 16/335 |
| | | | 707/754 |
| 2015/0113548 A1* | 4/2015 | Stern | H04N 21/84 |
| | | | 725/9 |
| 2015/0205511 A1* | 7/2015 | Vinna | G06F 3/04817 |
| | | | 715/716 |
| 2016/0188196 A1* | 6/2016 | Panchapakesan | G06F 9/451 |
| | | | 715/716 |
| 2016/0226804 A1* | 8/2016 | Hampson | G06Q 50/01 |
| 2017/0185598 A1* | 6/2017 | Srinivasaraghavan | |
| | | | G06F 16/24578 |
| 2017/0195447 A1* | 7/2017 | Panagos | H04L 67/5682 |
| 2018/0096390 A1* | 4/2018 | Hemmaplardh | G06Q 50/01 |
| 2018/0107668 A1* | 4/2018 | Jellison, Jr. | G06F 16/48 |
| 2018/0188945 A1* | 7/2018 | Garmark | G06F 3/167 |
| 2018/0189226 A1* | 7/2018 | Hofverberg | G06N 5/02 |
| 2019/0138656 A1* | 5/2019 | Yang | G06N 3/045 |
| 2019/0149863 A1* | 5/2019 | Lewis | H04N 21/25891 |
| | | | 706/12 |
| 2019/0361694 A1* | 11/2019 | Gordon | G06F 1/3231 |
| 2020/0296468 A1* | 9/2020 | Wittke | H04N 21/4751 |
| 2020/0380029 A1* | 12/2020 | Chen | G06F 16/64 |
| 2020/0413138 A1* | 12/2020 | Graf | G06N 3/08 |

FOREIGN PATENT DOCUMENTS

| | | | | | |
|---|---|---|---|---|---|
| AU | 2011205498 B2 | * | 4/2015 | | G06F 3/048 |
| CA | 3128228 A1 | * | 8/2020 | | G06F 3/0482 |
| CN | 1725854 A | * | 1/2006 | | |
| CN | 103164811 A | * | 6/2013 | | G06F 21/10 |
| CN | 103596057 A | | 2/2014 | | |
| CN | 103702214 A | | 4/2014 | | |
| CN | 104185039 A | | 12/2014 | | |
| CN | 104378662 A | | 2/2015 | | |
| CN | 105824820 A | | 8/2016 | | |
| CN | 105933791 A | | 9/2016 | | |
| CN | 105939490 A | | 9/2016 | | |
| CN | 107484021 A | | 12/2017 | | |
| CN | 107735786 A | * | 2/2018 | | |
| CN | 107995505 A | | 5/2018 | | |
| CN | 110392097 A | | 10/2019 | | |
| CN | 110933468 A | | 3/2020 | | |
| CN | 111314790 A | | 6/2020 | | |
| CN | 112463727 A | | 3/2021 | | |
| CN | 113032029 A | | 6/2021 | | |
| JP | 2017003975 A | * | 1/2017 | | |
| KR | 20190132476 A | * | 11/2019 | | |
| KR | 102212638 B1 | * | 2/2021 | | |
| WO | WO-2017095879 A1 | * | 6/2017 | | G06F 3/0482 |

OTHER PUBLICATIONS

Shomik Sen Bhattacharjee, "Spotify's New Home Screen Lets You Resume Podcasts From Where You Left Off", published Mar. 23, 2021 at https://in.mashable.com/tech/21118/spotifys-new-home-screen-lets-you-resume-podcasts-from-where-you-left-off, retrieved Jun. 6, 2023. (Year: 2021) (Year: 2021).*
International Search Report and Written Opinion dated Dec. 29, 2021 in International PCT Application No. PCT/CN2021/103159 (11 pages) with an English translation (2 pages).
First Office Action dated Nov. 10, 2022 in CN Application No. 202110328585.X, English translation (21 pages).
Second Office Action dated Jan. 12, 2023 in CN Application No. 202110328585.X, English translation (13 pages).

* cited by examiner

МЕТHOD AND APPARATUS FOR PROCESSING LISTENING RESUMING OF MUSIC APPLICATION, AND DEVICE

CROSS-REFERENCE TO RELATED APPLICATION

The present application is a National Stage of International Application No. PCT/CN2021/103159, filed on Jun. 29, 2021, which claims priority to Chinese Patent Application No. 202110328585.X titled "METHOD, APPARATUS AND DEVICE FOR PROCESSING LISTENING RESUMING OF MUSIC APPLICATION" filed on Mar. 26, 2021, both of the above applications are incorporated herein by reference in their entireties.

TECHNICAL FIELD

Embodiments of the present disclosure relate to a field of software technology and, in particular, to a method and an apparatus for processing listening resuming of a music application, a device, a computer readable storage medium, a computer program product and a computer program.

BACKGROUND

With an improvement in hardware performance of terminal devices and a continuous advancement of artificial intelligence technology, more and more applications (Application, referred to as App) are running on the terminal devices. At present, there are needs of users to listen to podcast programs in some music applications. Each program has a relatively long time duration (usually 40-60 minutes). When listening to the program, a user is often interrupted by reality scenarios, such that the user has to interrupt the listening, and then wait for resuming the listening when the user is available the next time.

However, the user needs to look for the program again in a program list the next time the user resumes the listening of the interrupted program, if the user has forgotten a name or other information of the program, the user will not be able to find the previously interrupted program, thereby causing the user to be unable to resume listening to the interrupted program again.

SUMMARY

The embodiments of the present disclosure provide a method and an apparatus for processing listening resuming of a music application, a device, a computer readable storage medium, a computer program product and a computer program, thereby allowing to overcome the problem in prior art that the user cannot resume the listening of a program subject to playing interruption again.

In a first aspect, an embodiment of the present disclosure provides a method for processing listening resuming of a music application, including:

acquiring a playing characteristic parameter of a program subject to playing interruption if occurrence of an event where the program is subjected to playing interruption is monitored, and determining, according to the playing characteristic parameter, whether the program subject to playing interruption satisfies a preset counting rule for listening resuming; and if yes, recording the program subject to playing interruption in a listening resuming module for a user to perform a listening resuming operation.

In a second aspect, an embodiment of the present disclosure provides an apparatus for processing listening resuming of a music application, including:

a determining unit, configured to acquire a playing characteristic parameter of a program subject to playing interruption if occurrence of an event where the program is subjected to playing interruption is monitored, and determine, according to the playing characteristic parameter, whether the program subject to playing interruption satisfies a preset counting rule for listening resuming; and a listening resuming unit, configured to record the program subject to playing interruption in a listening resuming module if the program subject to playing interruption satisfies the preset counting rule for listening resuming, for a user to perform a listening resuming operation.

In a third aspect, an embodiment of the present disclosure provides an electronic device, including: at least one processor and a memory;

the memory stores computer executable instructions;

the at least one processor executes the computer executable instructions stored in the memory, causing the at least one processor to execute the method for processing listening resuming of a music application according to the first aspect above.

In a fourth aspect, an embodiment of the present disclosure provides a computer readable storage medium that stores computer executable instructions which, when executed by a processor, cause the processor to implement the method for processing listening resuming of a music application according to the first aspect above.

In a fifth aspect, an embodiment of the present disclosure provides a computer program product including a computer program which, when executed by a processor, cause the processor to implement the method for processing listening resuming of a music application according to the first aspect above.

In a sixth aspect, an embodiment of the present disclosure provides a computer program which, when executed by a processor, cause the processor to implement the method for processing listening resuming of a music application according to the first aspect above.

The embodiments of the present disclosure provide a method and an apparatus for processing listening resuming of a music application, a device, a computer readable storage medium, a computer program product and a computer program. In the method, a playing characteristic parameter of a program subject to playing interruption is acquired if occurrence of an event where the program is subjected to playing interruption is monitored, and whether the program subject to playing interruption satisfies a preset counting rule for listening resuming is determined according to the playing characteristic parameter; if yes, the program subject to playing interruption is recorded in a listening resuming module for a user to perform a listening resuming operation, thus enabling the user to conveniently and quickly locate the program which is subject to playing interruption previously for resuming listening, thereby enhancing a user experience on the listening resuming operation. At the same time, according to the method for processing listening resuming in the embodiments of the present disclosure, whether the program subject to playing interruption is a subscribed program will not be distinguished, instead, the program is recorded in the listening resuming module as long as the preset counting rule for listening resuming is satisfied, which is thus more conformable to actual needs of the user.

BRIEF DESCRIPTION OF DRAWINGS

In order to more clearly explain the technical solutions in the embodiments of the present disclosure or the prior art, the following will briefly introduce the drawings that need to be used in the description of the embodiments or the prior art. Obviously, the drawings in the following description are some embodiments of the present disclosure. For those of ordinary skill in the art, other drawings can be obtained based on these drawings without paying creative work.

DESCRIPTION OF EMBODIMENTS

In order to further clarify the objectives, technical solutions and advantages of the embodiments of the present disclosure, the technical solutions in the embodiments of the present disclosure will be described clearly and completely in conjunction with the accompanying drawings in the embodiments of the present disclosure. Obviously, the described embodiments are some embodiments of the present disclosure, but not all of the embodiments. Based on the embodiments in the present disclosure, all other embodiments obtained by those of ordinary skill in the art without paying creative work shall fall within the protection scope of the present disclosure.

At present, a user could listen to a podcast program in some music applications. When listening to the programs, the user is often affected by an external environment and interrupts the playing of the program to which the user is listening. Later, when the user intends to resume listening, the user needs to search for the previous program in the music application manually for resuming listening (continuing listening). However, it requires frequent operations on an interface as the user searches for the program subject to playing interruption from a large number of program lists. Especially, if the user has forgotten a name or other information of the program, the user will not be able to find the previously interrupted program, thus rendering it impossible for the user to resuming the listening of the interrupted program again. In order to solve this technical problem, the embodiments of the present disclosure provide a method for processing listening resuming of a music application, where whether a program subject to playing interruption satisfies a preset counting rule for listening resuming is determined if occurrence of an event where the program is subjected to playing interruption is monitored on the music application, if yes, the program subject to playing interruption is recorded in a listening resuming module for a user to perform a listening resuming operation, which enables the user to locate the program previously being interrupted playing conveniently, thereby enhancing a user experience on the listening resuming operation.

Figure 1:
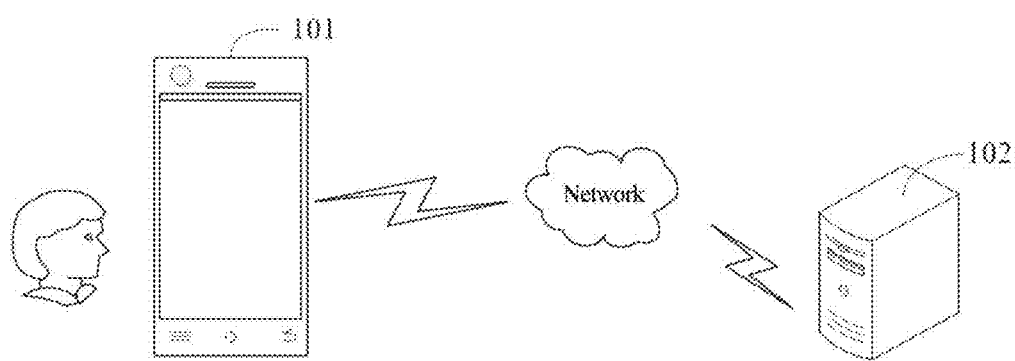
FIG. 1 is a schematic diagram of a scenario of a method for processing listening resuming of a music application provided by an embodiment of the present disclosure.

Referring to FIG. 1, which is a schematic diagram of a scenario of a method for processing listening resuming of a music application provided by an embodiment of the present disclosure. As shown in FIG. 1, a client 101 and a server 102 are included. The client 101 can be installed on a terminal device such as a mobile phone, a tablet computer, or a personal computer. The embodiment does not specifically limit the implementation of the client 101, as long as the client 101 can perform input/output interaction with the user. The server 102 may be one server or a cluster composed of several servers.

It should be noted that the client 101 may be installed on any form of terminal devices, and the terminal device related in the present disclosure may be a wireless terminal or a wired terminal. A wireless terminal may be a device that provides connectivity of voice and/or other service data for a user, a handheld device with a wireless connection function, or other processing devices connected to a wireless modem. The wireless terminal can communicate with one or more core network devices via a radio access network (referred to as RAN). The wireless terminal can be a mobile terminal, such as a mobile phone (or a "cellular" phone) and a computer having a mobile terminal, such as a portable, a pocket-sized, handheld, built-in computer or a vehicle-mounted mobile device, which exchanges voice and/or data with the wireless access network. For another example, the wireless terminal can also be a personal communication service (referred to as PCS) phone, a cordless phone, a session initiation protocol (referred to as SIP) phone, a wireless local loop (referred to as WLL) station, a personal digital assistant (referred to as PDA) and other device. The wireless terminal can also be referred to as a system, a subscriber unit, a subscriber station, a mobile station, a mobile, a remote station, a remote terminal, an access terminal, a user terminal, a user agent, a user device or a user equipment, which is not limited here. In an embodiment, the aforementioned terminal device may also be a device such as a smart watch, a tablet computer, etc. The server 102 may be one server or a cluster composed of multiple servers.

Figure 2:
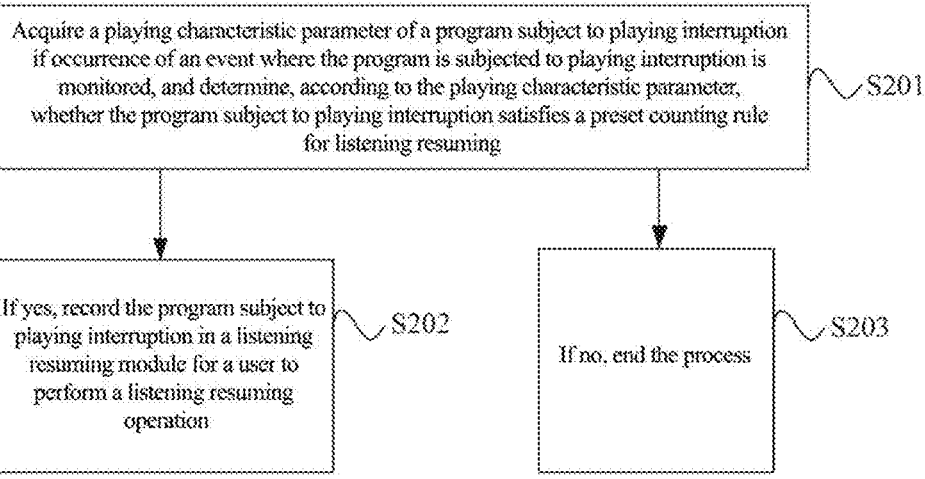
FIG. 2 is a first schematic flowchart of a method for processing listening resuming of a music application provided by an embodiment of the present disclosure.

Referring to FIG. 2, which is a first schematic flowchart of a method for processing listening resuming of a music application provided by an embodiment of the present disclosure. The method of the embodiment can be applied to the client shown in FIG. 1, and the method for processing listening resuming of the music application includes:

S201: acquire a playing characteristic parameter of a program subject to playing interruption if occurrence of an event where the program is subjected to playing interruption is monitored, and determine, according to the playing characteristic parameter, whether the program subject to playing interruption satisfies a preset counting rule for listening resuming.

In the embodiments of the present disclosure, the method for processing listening resuming of the embodiment can be applied to a music application that plays a program, where the program played on the music application may be a podcast program or other programs. For example, a type of programs of the music application may include at least one of the program content: audio programs, video programs, etc.

Specifically, the occurrence of the event where the program is subject to playing interruption is monitored may be that an operation of a user in the music application for actively stopping playing is monitored, or may be that occurrence of the music application being stopped due to stuck or other failures is monitored.

For example, as the user is listening to a certain program, and is interrupted by other affairs at this moment, the user clicks a pause button of the program, at this time occurrence of an event where the program is subjected to playing interruption is monitored by the music application.

Specifically, when a program is played on a music application, playing information of the program will be stored in a buffer of the music application, and a playing characteristic parameter of the program subject to playing interruption can be extracted from the playing information.

Where the playing characteristic parameter may include one or more of the following parameters: a playing progress parameter, a time point at which the playing is interrupted, a time interval since the last playing was stopped of the program subject to playing interruption, a playing completion parameter, and a content type of the program subject to playing interruption, etc.

Specifically, it is possible to determine whether the preset counting rule for listening resuming is satisfied according to whether the playing characteristic parameter satisfies a preset parameter threshold, or input the playing characteristic parameter of the program subject to playing interruption into a pre-trained model, a detection result is output, and determine whether the preset counting rule for listening resuming is satisfied according to the detection result.

S202: if the program subject to playing interruption satisfies the preset counting rule for listening resuming, record the program subject to playing interruption in a listening resuming module for the user to perform a listening resuming operation.

In the embodiments of the present disclosure, the listening resuming module may be a control of the music application, and the user may activate the listening resuming module through a triggering operation on the control, so as to display a list of all the programs in the listening resuming module which are subject to playing interruption.

S203: end the process if the program subject to playing interruption does not satisfy the preset counting rule for listening resuming.

In the embodiments of the present disclosure, if the program subject to playing interruption does not satisfy the preset counting rule for listening resuming, no recording or other any operations will be performed on the program subject to playing interruption to avoid excessive interference to usage of the music application by the user.

It can be seen from the above description that if occurrence of an event where the program is subjected to playing interruption is monitored, whether the program subject to playing interruption satisfies the preset counting rule for listening resuming is determined; if yes, the program subject to playing interruption is recorded in a listening resuming module for a user to perform a listening resuming operation, thus enabling the user to conveniently and quickly locate the program which is subject to playing interruption previously for resuming listening, thereby enhancing a user experience on the listening resuming operation. At the same time, according to the method for processing listening resuming in the embodiments, whether the program subject to playing interruption is a subscribed program will not be distinguished, instead, the program is recorded in the listening resuming module as long as the preset counting rule for listening resuming is satisfied, which is thus more conformable to actual needs of the user.

Figure 3:
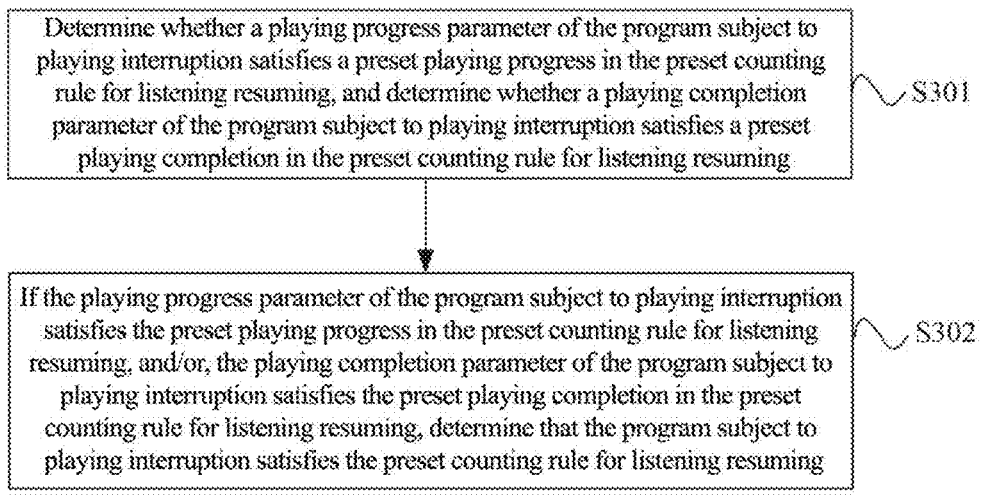
FIG. 3 is a second schematic flowchart of a method for processing listening resuming of a music application provided by an embodiment of the present disclosure.

Referring to FIG. 3, which is a second flowchart of a method for processing listening resuming of a music application provided by an embodiment of the present disclosure. On the basis of the above-mentioned embodiment, in step S210, the determining, according to the playing characteristic parameter, whether the program subject to playing interruption satisfies the preset counting rule for listening resuming may include:

S301: determine whether a playing progress parameter of the program subject to playing interruption satisfies a preset playing progress in the preset counting rule for listening resuming, and determine whether a playing completion parameter of the program subject to playing interruption satisfies a preset playing completion in the preset counting rule for listening resuming; and S302: if the playing progress parameter of the program subject to playing interruption satisfies the preset playing progress in the preset counting rule for listening resuming, and/or, the playing completion parameter of the program subject to playing interruption satisfies the preset playing completion in the preset counting rule for listening resuming, determine that the program subject to playing interruption satisfies the preset counting rule for listening resuming.

Where the determining whether the playing progress parameter of the program subject to playing interruption satisfies the preset playing progress in the preset counting rule for listening resuming may be determining whether the playing progress parameter is greater than a preset threshold of the preset playing progress.

Where the determining whether the playing completion parameter of the program subject to playing interruption satisfies the preset playing completion in the preset counting rule for listening resuming may be determining whether the playing completion parameter is less than a threshold of the preset playing completion.

Specifically, it could be that, if the playing progress parameter is greater than the preset threshold of the preset playing progress, or the playing completion parameter is less than the threshold of the preset playing completion, then determine that the program subject to playing interruption satisfies the preset counting rule for listening resuming; or, if the playing progress parameter is greater than the preset threshold of the preset playing progress, and the playing completion parameter is less than the threshold of the preset playing completion, then determine that the program subject to playing interruption satisfies the preset counting rule for listening resuming.

In an embodiment, the preset threshold of the preset playing progress may be 60 seconds, and the threshold of the preset playing completion may be 95%.

It can be seen from the above description that, by determining whether the counting rule for listening resuming is satisfied according to the playing progress and/or the playing completion, whether the program subject to playing interruption needs to be moved into the listening resuming module can be quickly determined, thereby improving the efficiency of identifying the program.

In another embodiment of the present disclosure, the determining, according to the playing characteristic parameter, whether the program subject to playing interruption satisfies the preset counting rule for listening resuming may further include:

determining whether a popularity parameter of the program subject to playing interruption satisfies a preset popularity in the preset counting rule for listening resuming; and if the popularity parameter of the program subject to playing interruption satisfies the preset popularity in the preset counting rule for listening resuming, determining that the program subject to playing interruption satisfies the preset counting rule for listening resuming.

In the embodiments of the present disclosure, the popularity parameter may include a total number of times that the program which is subject to playing interruption is played or collected.

Where the determining whether the popularity parameter of the program subject to playing interruption satisfies the preset popularity in the preset counting rule for listening resuming may be determining whether the total number of times that the program which is subject to playing interruption is played exceeds a preset threshold of the number of times played, or whether the total number of times that the program which is subject to playing interruption is collected exceeds a preset threshold of the number of times collected, or may be determining whether a sum of both the total number of times that the program which is subject to playing interruption is played and the total number of times that the program which is subject to playing interruption is collected exceeds a threshold of the total number of times.

Specifically, it could be that if the total number of times that the program which is subject to playing interruption is played exceeds the preset threshold of the number of times played, or the total number of times that the program which is subject to playing interruption is collected exceeds the threshold of the preset threshold of the number of times collected, determine that the program subject to playing interruption satisfies the preset counting rule for listening resuming; or it could be that if the sum of both the total number of times that the program which is subject to playing interruption is played and the total number of times that the program which is subject to playing interruption is collected exceeds the threshold of the total number of times, determine that the program subject to playing interruption satisfies the preset counting rule for listening resuming.

In an embodiment, the preset threshold of the number of times played, the preset threshold of the number of times collected, and the threshold of the total number of times in the embodiment can be set according to requirements in the music application.

It can be seen from the above description that, by determining whether the program subject to playing interruption satisfies with the preset counting rule for listening resuming according to the playing popularity, whether the program subject to playing interruption needs to be moved into the listening resuming module is determined according to the popularity of the user for the program, so that the interest of the user on programs in the listening resuming module is increased, and user viscosity with respect to the listening resuming module is enhanced.

In another embodiment of the present disclosure, the determining, according to the playing characteristic parameter, whether the program subject to playing interruption satisfies the preset counting rule for listening resuming may further include:

inputting the playing characteristic parameter into a preset model, so that the preset model outputs a detection result of whether the program subject to playing interruption satisfies the preset counting rule for listening resuming; where the preset model is obtained through training on playing characteristic parameters in a set time period.

In the embodiment of the present disclosure, the preset model may be a neural network learning model, specifically, a deep neural network learning model.

The preset model in the embodiment is obtained through training on playing characteristic parameters in a set time period, where the set time period could be 6 months or 12 months, which is not limited in the present disclosure. The playing characteristic parameter could be one or more of the following parameters: a playing progress parameter, a playing completion parameter, a time point at which the playing is interrupted, a time interval since the last playing was stopped of the program subject to playing interruption, and a content type of the program subject to playing interruption, etc.

Specifically, label the obtained respective playing characteristic parameters in the set time period with detection results to get a training data set; establish an initial preset model, and input the playing characteristic parameters in the training data set into the initial preset model, so that the model outputs detection results, and adjusts weight parameters of the model according to the labeled detection results, if the number of times trained satisfies a preset number of iterations or a calculation error of a loss function satisfies a preset error condition, stop the training and a trained preset model is obtained.

It can be seen from the above description that, by using a pre-trained model algorithm to identify the playing characteristic parameter, multiple playing characteristic parameters can be considered comprehensively to ensure that an interrupted program which is more suitable for the user is recorded in the listening resuming module, thus enhancing a user experience on listening resuming.

In an embodiment of the present disclosure in the above step S202, after recording the program subject to playing interruption in a listening resuming module, the method further includes:

S204: display a playlist of the listening resuming module in response to a triggering operation of user on the listening resuming module, where the playlist includes the program subject to playing interruption.

Figure 4:
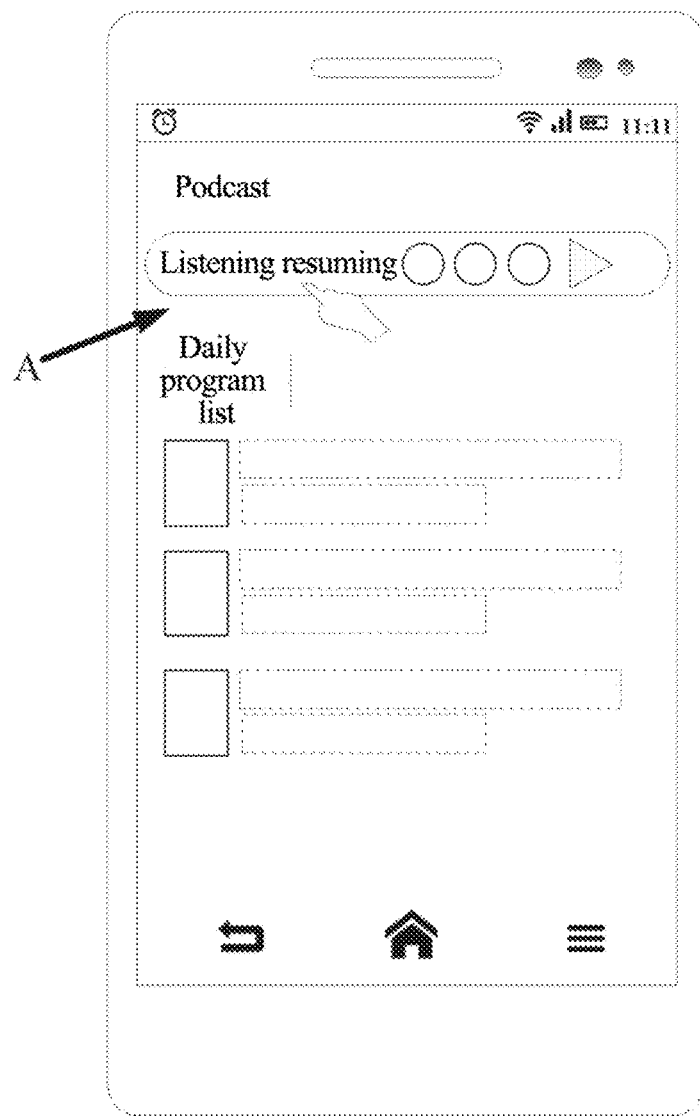
FIG. 4 is a first schematic diagram of a listening resuming module provided by an embodiment of the present disclosure.

In the embodiment of the present disclosure, the listening resuming module is a bar-shaped touch control. Referring to FIG. 4, which is a first schematic diagram of the listening resuming module provided by an embodiment of the present disclosure. As shown in FIG. 4, the listening resuming module is a bar-shaped touch control (shown as A in FIG. 4) located at a top area of a current page of the music application.

It can be seen from the above description that by designing the listening resuming module as a narrow strip shape, the page space is saved, and the user experience is better compared to an existing display mode that occupies a larger space on a screen.

Figure 5:
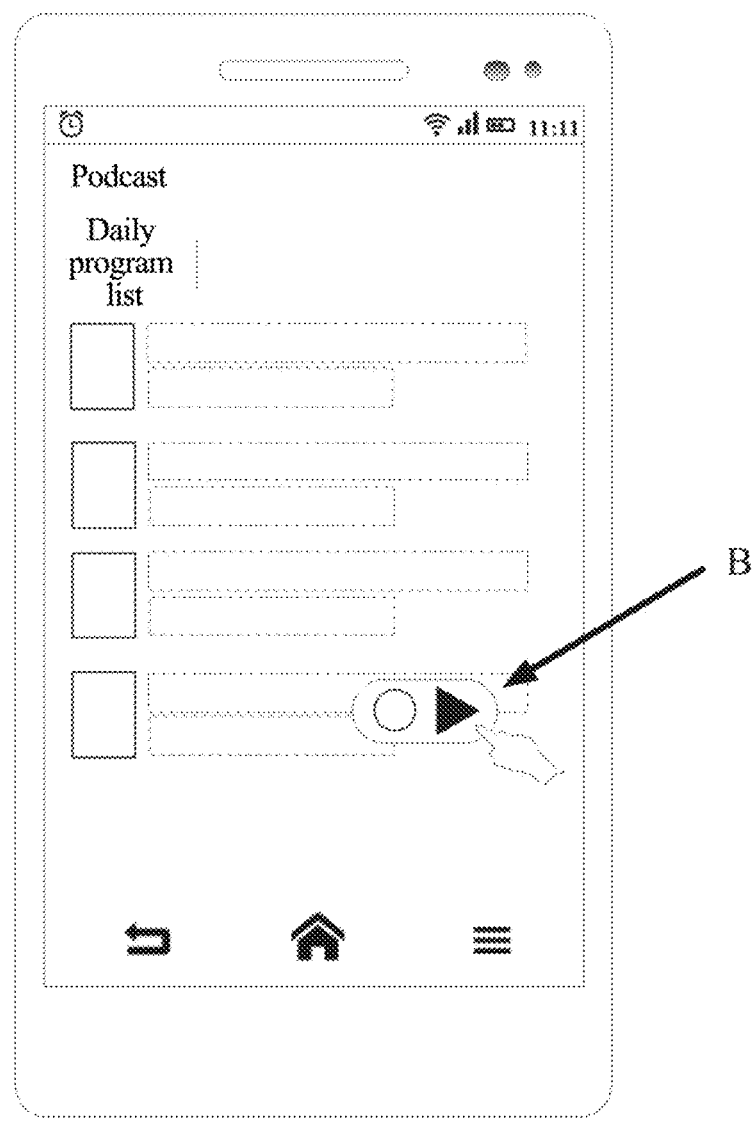
FIG. 5 is a second schematic diagram of a listening resuming module provided by an embodiment of the present disclosure.

In the embodiment of the present disclosure, the listening resuming module is a bar-shaped touch control. Referring to FIG. 5, which is a second schematic diagram of the listening resuming module provided by an embodiment of the present disclosure. As shown in FIG. 5, the listening resuming module is a floating touch control (shown as B in FIG. 5), which is floating in any area of the current page of the music application, and the user can drag the floating control causally to any position.

It can be seen from the above description that by designing the listening resuming module as a floating control, the user can drag the control causally, in this way, needs of the user in different scenarios are met and the adaptability is thus strong.

In the embodiment of the present disclosure, a style of a title of the listening resuming module may be a block title, which is displayed as "Listening resuming list" or "Continue Listening".

Where the listening resuming module can be located at the top of the current page of the music application. If there is no program playing history of the user, not display the listening resuming module.

The listening resuming module includes a list of programs subject to playing interruption. The list includes program content units, and each program content unit displays information such as a cover of a program, a title of a program, a name of a program, and a playing progress. The presentation of the playing progress could be "Remaining time, XXX mins left".

In the listening resuming module, up to 20 or 50 programs subject to playing interruption can be displayed. The program subject to playing interruption can be arranged from close to far away in time according to time when events of the programs subject to playing interruption occur.

Among them, the program content unit is provided with a play pause button. Initially, the play pause button is in a pause state. The user clicks the entire program content unit, and the corresponding program subject to playing interruption continues to play, and the play pause button turns to a playing state; the user clicks the entire program content unit again, the corresponding program subject to playing interruption stops, and the play pause button turns to the pause state. A program that has been interrupted when being restarted playing is displayed in a highlighted state, which is convenient for the user to locate.

It should be noted that: the listening resuming module also includes editing functions. On a list page of the listening resuming module, an "Edit" button can be set in an upper right corner. The user clicks the "Edit" button to enter an editing page, and the program content unit turns to a deletable state. At the same time, a "Clear" button is set at a bottom of the editing page, and the user could click the "Clear" button to clear all program content units.

Figure 6:
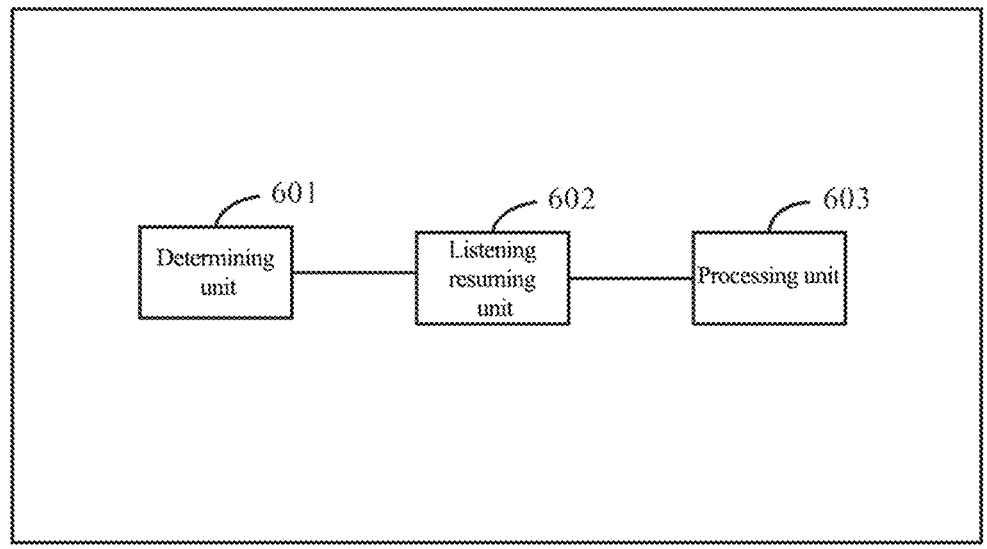
FIG. 6 is a structural block diagram of an apparatus for processing listening resuming of a music application provided by an embodiment of the present disclosure.

Corresponding to the method for processing listening resuming of a music application in the above embodiment, FIG. 6 is a structural block diagram of an apparatus for processing listening resuming of a music application provided in an embodiment of the disclosure. Only parts related to the embodiments of the present disclosure are shown for ease of illustration. Referring to FIG. 6, the device includes: a determining unit 601 and a listening resuming unit 602.

The determining unit 601 is configured to acquire a playing characteristic parameter of a program subject to playing interruption if occurrence of an event where the program is subjected to playing interruption is monitored, and determine, according to the playing characteristic parameter, whether the program subject to playing interruption satisfies a preset counting rule for listening resuming;

the listening resuming unit 602 is configured to record the program subject to playing interruption in a listening resuming module if the program subject to playing interruption satisfies the preset counting rule for listening resuming, for the user to perform a listening resuming operation.

In one or more embodiments of the present disclosure, the playing characteristic parameter includes a playing progress parameter and a playing completion parameter of the program subject to playing interruption. The determining unit 601 is further configured to: if the playing progress parameter of the program subject to playing interruption satisfies a preset playing progress in the preset counting rule for listening resuming, and/or, the playing completion parameter of the program subject to playing interruption satisfies a preset playing completion in the preset counting rule for listening resuming, determine that the program subject to playing interruption satisfies the preset counting rule for listening resuming.

In one or more embodiments of the present disclosure, the playing characteristic parameter includes a popularity parameter of the program subject to playing interruption, and the determining unit 601 is further configured to: if the popularity parameter satisfies the preset popularity in the preset counting rule for listening resuming, determine that the program subject to playing interruption satisfies the preset counting rule for listening resuming.

In one or more embodiments of the present disclosure, the determining unit 601 is further configured to input the playing characteristic parameter into a preset model, so that the preset model outputs a detection result of whether the program subject to playing interruption satisfies the preset counting rule for listening resuming; where the preset model is obtained through training on playing characteristic parameters within a set time period.

In one or more embodiments of the present disclosure, referring to FIG. 6, the apparatus further includes: a processing unit 603, configured to, after the program subject to playing interruption is recorded in the listening resuming module, display a playlist of the listening resuming module in response to a triggering operation of the user on the listening resuming module, where the program subject to playing interruption is included in the playlist.

In one or more embodiments of the present disclosure, the listening resuming module is a bar-shaped touch control.

In one or more embodiments of the present disclosure, the listening resuming module is a floating touch control.

The device provided in the embodiment can be used to implement the technical solutions of the foregoing method embodiments, to which its implementation principles and technical effects are similar, and details are not described herein again in the embodiment.

In order to implement the above-mentioned embodiments, the embodiments of the present disclosure also provide an electronic device.

Figure 7:
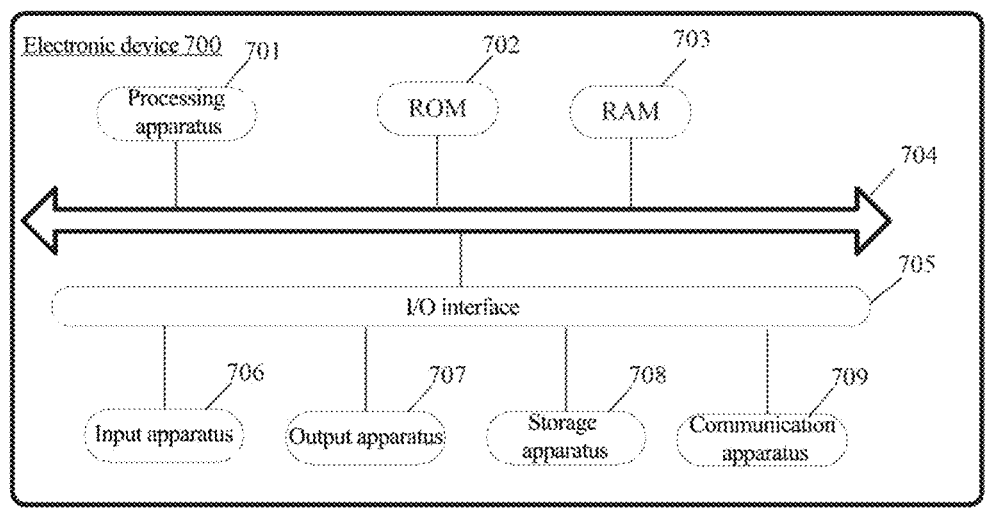
FIG. 7 is a schematic structural diagram of an electronic device provided by an embodiment of the present disclosure.

Refer to FIG. 7, which shows a schematic structural diagram of an electronic device 700 suitable for implementing the embodiments of the present disclosure, the electronic device may be a terminal device or a server. Where the terminal device may include, but is not limited to, a mobile terminal, such as a mobile phone, a notebook computer, a digital broadcast receiver, a personal digital assistant (Personal Digital Assistant, PDA), a portable android device (Portable Android Device, PAD), a portable multimedia player (Portable Media Player, PMP), an in-vehicle terminal (for example, an in-vehicle navigation terminal) and the like, and a fixed terminal, such as a digital television (Television, TV), a desktop computer and the like. The electronic device shown in FIG. 7 is only an example, and should not bring any limitation to the function and scope of use of the embodiments of the present disclosure.

As shown in FIG. 7, the electronic device 700 may include a processing apparatus (such as a central processor, a graphics processor, etc.) 701, which may perform various appropriate actions and processing according to a program stored in a read-only memory (Read-Only Memory, ROM) 702 or a program loaded from a storage apparatus 708 to a random access memory (Random Access Memory, RAM) 703. In the RAM 703, various programs and data required for the operation of the terminal device 700 are also stored. The processing apparatus 701, the ROM 702, and the RAM

703 are connected to each other through a bus 704. An input/output (Input/Output, I/O) interface 705 is also connected to the bus 704.

Generally, the following apparatuses may be connected to the I/O interface 705: an input apparatus 706, including for example a touch screen, a touch panel, a keyboard, a mouse, a camera, a microphone, a accelerometer, a gyroscope, and the like; an output apparatus 707, including for example a liquid crystal display (Liquid Crystal Display, LCD), a speaker, a vibrator, and the like; a storage apparatus 708, including for example a magnetic tape, a hard disk, and the like; and a communication apparatus 709. The communication apparatus 709 may allow the electronic device 700 to perform wireless or wired communication with other devices to exchange data. Although FIG. 7 shows the electronic device 700 with multiple kinds of apparatuses, it is not required to implement or have all the apparatuses shown in FIG. 7. It may alternatively be implemented or provided with more or fewer apparatuses.

In particular, according to an embodiment of the present disclosure, the process described above with reference to the flowchart may be implemented as a computer software program. For example, an embodiment of the present disclosure includes a computer program product, which includes a computer program carried on a computer readable medium, and the computer program contains program codes for executing the method shown in the flowchart. In such an embodiment, the computer program may be downloaded from a network and installed through the communication apparatus 709, or installed from the storage apparatus 708, or installed from the ROM 702. When the computer program is executed by the processing apparatus 701, the above-mentioned functions defined in the method of the embodiment of the present disclosure are executed. An embodiment of the present disclosure provides a computer program which, when executed by a processor, implements the method for processing listening resuming of a music application according to the first aspect above.

It should be noted that, the above-mentioned computer readable medium in the present disclosure may be a computer readable signal medium or a computer readable storage medium or any combination of the both. The computer readable storage medium may be, for example, but not limited to, an electrical, magnetic, optical, electromagnetic, infrared, or semiconductor system, apparatus or device, or any combination of the above. More specific examples of the computer readable storage medium may include, but are not limited to: an electrical connection with one or more wires, a portable computer disk, a hard disk, a random access memory (RAM), a read only memory (ROM), an erasable programmable read-only memory (Erasable Programmable Read-Only Memory, EPROM), a flash memory, an optical fiber, a compact disc read-only memory (Compact Disc Read-Only Memory, CD-ROM), an optical storage device, a magnetic storage device, or any suitable combination of the above. In the present disclosure, the computer readable storage medium may be any tangible medium that contains or stores a program, and the program may be used by or in combination with an instruction execution system, apparatus, or device. In the present disclosure, a computer readable signal medium may include a data signal propagated in a baseband or propagated as a part of a carrier wave, and a computer readable program code is carried therein. This propagated data signal may adopt many forms, including but not limited to, an electromagnetic signal, an optical signal, or any suitable combination of the above. The computer readable signal medium may also be any computer readable medium other than the computer readable storage medium, the computer readable signal medium may send, propagate, or transmit the program used by or in combination with the instruction execution system, apparatus, or device. The program code contained on the computer readable medium may be transmitted by any suitable medium, including but not limited to: a wire, an optical cable, RF (Radio Frequency), etc., or any suitable combination of the above.

The above-mentioned computer readable medium may be included in the above-mentioned terminal device; or it may exist alone without being assembled into the electronic device.

The above-mentioned computer readable medium carries one or more programs, and when the above-mentioned one or more programs are executed by the electronic device, the electronic device is caused to execute the method shown in the above-mentioned embodiments.

The computer program code used to perform operations of the present disclosure may be written in one or more programming languages or a combination thereof. The above-mentioned programming languages include an object-oriented programming language—such as Java, Smalltalk, C++, and also include a conventional procedural programming language—such as "C" language or similar programming language. The program code may be executed entirely on a computer of a user, partly on a computer of a user, executed as an independent software package, partly executed on a computer of a user and partly executed on a remote computer, or entirely executed on a remote computer or server. In a case where a remote computer is involved, the remote computer may be connected to the computer of the user through any kind of network—including a local area network (Local Area Network, LAN) or a wide area network (Wide Area Network, WAN), or, it may be connected to an external computer (for example, connected via the Internet through an Internet service provider).

The flowcharts and block diagrams in the accompanying drawings illustrate possible implementation architecture, functions, and operations of the system, method, and computer program product according to the embodiments of the present disclosure. In this point, each block in the flowchart or block diagram may represent a module, a program segment, or a part of code, and the module, the program segment, or the part of code contains one or more executable instructions for implementing a designated logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that, each block in the block diagram and/or flowchart, and a combination of the blocks in the block diagram and/or flowchart, may be implemented by a dedicated hardware-based system that performs designated functions or operations, or may be implemented by a combination of dedicated hardware and computer instructions.

The units involved in the embodiments of the present disclosure may be implemented in software or hardware. Where a name of a unit does not constitute a limitation on the unit itself in one case. For example, a first acquiring unit may also be described as "a unit that acquires at least two Internet Protocol addresses".

The functions described above may be performed at least in part by one or more hardware logic components. For example, non-restrictively, exemplary types of hardware logic components that may be used include: a field programmable gate array (Field Programmable Gate Array, FPGA), an application specific integrated circuit (Application Specific Integrated Circuit, ASIC), an application specific standard product (Application Specific Standard Product, ASSP), a system on chip (System On Chip, SOC), a complex programmable logic device (Complex Programmable Logic Device, CPLD), etc.

In a first aspect, an embodiment of the present disclosure provides a method for processing listening resuming of a music application, including:

acquiring a playing characteristic parameter of a program subject to playing interruption if occurrence of an event where the program is subjected to playing interruption is monitored, and determining, according to the playing characteristic parameter, whether the program subject to playing interruption satisfies a preset counting rule for listening resuming; and if yes, recording the program subject to playing interruption in a listening resuming module for a user to perform a listening resuming operation.

In one or more embodiments of the present disclosure, the playing characteristic parameter includes a playing progress parameter and a playing completion parameter of the program subject to playing interruption;

the determining, according to the playing characteristic parameter, whether the program subject to playing interruption satisfies the preset counting rule for listening resuming includes:

if the playing progress parameter of the program subject to playing interruption satisfies a preset playing progress in the preset counting rule for listening resuming, and/or, the playing completion parameter of the program subject to playing interruption satisfies a preset playing completion in the preset counting rule for listening resuming, determining that the program subject to playing interruption satisfies the preset counting rule for listening resuming.

In one or more embodiments of the present disclosure, the playing characteristic parameter includes a popularity parameter of the program subject to playing interruption;

the determining, according to the playing characteristic parameter, whether the program subject to playing interruption satisfies the preset counting rule for listening resuming includes:

if the popularity parameter of the program subject to playing interruption satisfies the preset popularity in the preset counting rule for listening resuming, determining that the program subject to playing interruption satisfies the preset counting rule for listening resuming.

In one or more embodiments of the present disclosure, the determining, according to the playing characteristic parameter, whether the program subject to playing interruption satisfies the preset counting rule for listening resuming includes:

inputting the playing characteristic parameter into a preset model, so that the preset model outputs a detection result of whether the program subject to playing interruption satisfies the preset counting rule for listening resuming; and where the preset model is obtained through training on playing characteristic parameters in a set time period.

In one or more embodiments of the present disclosure, after the recording the program subject to playing interruption in the listening resuming module, the method further includes:

displaying a playlist of the listening resuming module in response to a triggering operation of the user on the listening resuming module, where the playlist includes the program subject to playing interruption.

In one or more embodiments of the present disclosure, the listening resuming module is a bar-shaped touch control.

In one or more embodiments of the present disclosure, the listening resuming module is a floating touch control.

In a second aspect, an embodiment of the present disclosure also provides an apparatus for processing listening resuming of a music application, including:

a determining unit, configured to acquire a playing characteristic parameter of a program subject to playing interruption if occurrence of an event where the program is subjected to playing interruption is monitored, and determine, according to the playing characteristic parameter, whether the program subject to playing interruption satisfies a preset counting rule for listening resuming; and a listening resuming unit, configured to record the program subject to playing interruption in a listening resuming module if the program subject to playing interruption satisfies the preset counting rule for listening resuming for a user to perform a listening resuming operation.

In one or more embodiments of the present disclosure, the playing characteristic parameter includes a playing progress parameter and a playing completion parameter of the program subject to playing interruption, and the determining unit is further configured to: if the playing progress parameter of the program subject to playing interruption satisfies a preset playing progress in the preset counting rule for listening resuming, and/or, the playing completion parameter of the program subject to playing interruption satisfies a preset playing completion in the preset counting rule for listening resuming, determine that the program subject to playing interruption satisfies the preset counting rule for listening resuming.

In one or more embodiments of the present disclosure, the playing characteristic parameter includes a popularity parameter of the program subject to playing interruption, and the determining unit is further configured to: if the popularity parameter of the program subject to playing interruption satisfies a preset popularity in the preset counting rule for listening resuming, determine that the program subject to playing interruption satisfies the preset counting rule for listening resuming.

In one or more embodiments of the present disclosure, the determining unit is further configured to input the playing characteristic parameter into a preset model, so that the preset model outputs a detection result of whether the program subject to playing interruption satisfies the preset counting rule for listening resuming; where the preset model is obtained through training on playing characteristic parameters within a set time period.

In one or more embodiments of the present disclosure, the apparatus further includes: a processing unit, configured to, after the program subject to playing interruption is recorded in the listening resuming module, display a playlist of the listening resuming module in response to a triggering operation of the user on the listening resuming module, where the playlist includes the program subject to playing interruption.

In one or more embodiments of the present disclosure, the listening resuming module is a bar-shaped touch control.

In one or more embodiments of the present disclosure, the listening resuming module is a floating touch control.

In a third aspect, an embodiment of the present disclosure provides an electronic device, including: at least one processor and a memory;

the memory stores computer executable instructions;

the at least one processor executes the computer executable instructions stored in the memory, causing the at least one processor to execute the method for processing listening resuming of a music application according to the first aspect above.

In a fourth aspect, an embodiment of the present disclosure provides a computer readable storage medium that stores computer executable instructions which, when executed by a processor, implement the method for processing listening resuming of a music application according to the first aspect above.

In a fifth aspect, an embodiment of the present disclosure provides a computer program product, including a computer program which, when executed by a processor, implements the method for listening resuming of a music application according to the first aspect above.

In a sixth aspect, an embodiment of the present disclosure provides a computer program which, when executed by a processor, implements the method for listening resuming of a music application according to the first aspect above.

The above description is only preferred embodiments of the present disclosure and an illustration of the applied technical principles. Those skilled in the art should understand that, the disclosure scope involved in the present disclosure is not limited to the technical solutions formed by the specific combination of the above technical features, but also covers other technical solutions formed by the arbitrary combination of the above technical features or their equivalent features without departing from the above disclosure concept, for example, a technical solution formed by replacing the above features with technical features with similar functions disclosed (but not limited to) in the present disclosure.

In addition, although each operation is described in a specific order, this should not be understood as requiring these operations to be performed in the specific order or in a sequential order shown. Under certain circumstances, multitasking and parallel processing may be advantageous. Similarly, although several specific implementation details are included in the above discussion, these should not be interpreted as limiting the scope of the present disclosure. Certain features described in the context of a single embodiment may also be implemented in combination in the single embodiment. Conversely, various features described in the context of a single embodiment may also be implemented in multiple embodiments individually or in any suitable sub combination.

Although the subject matter has been described in language specific to structural features and/or method logical actions, it should be understood that the subject matter defined in the appended claims is not limited to the specific features or actions described above. On the contrary, the specific features and actions described above are only exemplary forms for implementing the claims.

What is claimed is:

1. A method for processing listening resuming of a music application, comprising:
   detecting an event where a program subject to playing by the music application is interrupted;
   acquiring a playing characteristic parameter of a program subject to playing interruption, and determining, according to the playing characteristic parameter, whether the program subject to playing interruption satisfies a preset counting rule for listening resuming, wherein the determining is based on a preset model;
   upon determining that the program subject to playing interruption satisfies the preset counting rule for listening resuming, recording the program subject to playing interruption in a listening resuming module for the user to perform a listening resuming operation, wherein the listening resuming module is an interactive control in the music application; and
   upon determining that the program subject to playing interruption does not satisfy the preset counting rule for listening resuming, skipping recording the program subject to playing interruption in the interactive control,
   wherein the determining, according to the playing characteristic parameter, whether the program subject to playing interruption satisfies the preset counting rule for listening resuming comprises:
   inputting the playing characteristic parameter into the preset model, so that the preset model outputs a detection result of whether the program subject to playing interruption satisfies the preset counting rule for listening resuming;
   wherein the preset model is obtained through training on playing characteristic parameters in a set time period, and the playing characteristic parameter comprises one or more of the playing progress parameter, a time point at which the playing is interrupted, a time interval since the last playing was stopped of the program subject to playing interruption, the playing completion parameter, and a content type of the program subject to playing interruption.

2. The method according to claim 1, after recording the program subject to playing interruption in the listening resuming module, further comprising:
   displaying a playlist of the listening resuming module in response to a triggering operation of the user on the listening resuming module, wherein the playlist comprises the program subject to playing interruption.

3. The method according to claim 1, wherein the listening resuming module is a bar-shaped touch control.

4. The method according to claim 1, wherein the listening resuming module is a floating touch control.

5. A non-transient computer readable storage medium that stores computer executable instructions which, when executed by a processor, cause the processor to implement the method for processing listening resuming of a music application according to claim 1.

6. An apparatus for processing listening resuming of a music application, comprising: at least one processor and a memory;
   the memory stores computer executable instructions;
   the at least one processor executes the computer executable instructions stored in the memory to:
   detect an event where a program is subject to playing by the music application is interrupted;
   acquire a playing characteristic parameter of the program subject to playing interruption, and determine, according to the playing characteristic parameter, whether the program subject to playing interruption satisfies a preset counting rule for listening resuming, wherein the determining is based on a preset model; and
   upon determining that the program subject to playing interruption satisfies the preset counting rule for listening resuming, record the program subject to playing interruption in a listening resuming module for a user to perform a listening resuming operation, wherein the listening resuming module is an interactive control in the music application; and
   upon determining that the program subject to playing interruption does not satisfy the preset counting rule for listening resuming, skip recording the program subject to playing interruption in the interactive control, wherein the processor is further configured to input the playing characteristic parameter into the preset model, so that the preset model outputs a detection result of whether the program subject to playing interruption satisfies the present counting rule for listening resuming, wherein the preset model is obtained through training on playing characteristic parameters within a set time period, and the playing characteristic parameter comprises one or more of the playing progress parameter, a time point at which the playing is interrupted, a time interval since the last playing was stopped of the program subject to playing interruption, the playing completion parameter, and a content type of the program subject to playing interruption.

7. The apparatus according to claim 6, wherein the processor is further configured to, after the program subject to playing interruption is recorded in the listening resuming module, display a playlist of the listening resuming module in response to a triggering operation of the user on the listening resuming module, wherein the playlist comprises the program subject to playing interruption.

8. The apparatus according to claim 6, wherein the listening resuming module is a bar-shaped touch control.

9. The apparatus according to claim 6, wherein the listening resuming module is a floating touch control.

* * * * *